United States Patent
Thodiyil

(10) Patent No.: US 11,968,356 B2
(45) Date of Patent: Apr. 23, 2024

(54) DECODER-SIDE MOTION VECTOR REFINEMENT (DMVR) INTER PREDICTION USING SHARED INTERPOLATION FILTERS AND REFERENCE PIXELS

(71) Applicant: QUALCOMM Incorporated, San Diego, CA (US)

(72) Inventor: John Thodiyil, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/696,663

(22) Filed: Mar. 16, 2022

(65) Prior Publication Data

US 2023/0300320 A1  Sep. 21, 2023

(51) Int. Cl.
*H04N 19/105* (2014.01)
*H04N 19/117* (2014.01)
*H04N 19/139* (2014.01)
*H04N 19/176* (2014.01)
*H04N 19/513* (2014.01)

(52) U.S. Cl.
CPC ......... *H04N 19/105* (2014.11); *H04N 19/117* (2014.11); *H04N 19/139* (2014.11); *H04N 19/176* (2014.11); *H04N 19/521* (2014.11)

(58) Field of Classification Search
CPC ............................ H04N 19/105; H04N 19/117
See application file for complete search history.

(56) References Cited

U.S. PATENT DOCUMENTS

| 9,407,928 | B2* | 8/2016 | Alshina | H04N 19/61 |
| 11,770,539 | B2* | 9/2023 | Ahn | H04N 19/577 |
| | | | | 375/240.13 |
| 2011/0176611 | A1* | 7/2011 | Huang | H04N 19/46 |
| | | | | 375/E7.123 |
| 2012/0170650 | A1* | 7/2012 | Chong | H04N 19/117 |
| | | | | 375/E7.243 |
| 2014/0301463 | A1* | 10/2014 | Rusanovskyy | H04N 19/52 |
| | | | | 375/240.16 |
| 2015/0110178 | A1* | 4/2015 | Kim | H04N 19/13 |
| | | | | 375/240.03 |
| 2016/0286232 | A1* | 9/2016 | Li | H04N 19/52 |
| 2016/0366415 | A1* | 12/2016 | Liu | H04N 19/463 |
| 2018/0070105 | A1* | 3/2018 | Jin | H04N 19/521 |

(Continued)

OTHER PUBLICATIONS

Chen C.C., et al., "CE9.2.13: MVD-based Early-Skip Method and Switchable MC Filters for DMVR," JVET-L0244-v2, Joint Video Experts Team (JVET) of ITU-T SG 16 WP 3 and ISO/IEC JTC 1/SC 29/WG 11, 12th Meeting: Macao, CN, Oct. 3, 2018-Oct. 12, 2018, No. JVET-L0244, Oct. 1, 2018, XP030194188, pp. 1-6.

(Continued)

*Primary Examiner* — Irfan Habib
(74) *Attorney, Agent, or Firm* — Polsinelli LLP

(57) ABSTRACT

Systems and techniques are provided for processing video data. For example, an apparatus may obtain a reference data block for predicting a block of video data and determine, using an inter-prediction processing path, one or more refined motion vectors based on the reference data block. The apparatus may perform, using the inter-prediction processing path, inter-prediction for the block of video data, wherein the inter-prediction is based on the reference data block and the one or more refined motion vectors.

26 Claims, 6 Drawing Sheets

(56) References Cited

U.S. PATENT DOCUMENTS

| | | | | |
|---|---|---|---|---|
| 2020/0128258 A1* | 4/2020 | Chen | ................... | H04N 19/139 |
| 2020/0221122 A1* | 7/2020 | Ye | ...................... | H04N 19/577 |
| 2021/0400259 A1* | 12/2021 | Sethuraman | ......... | H04N 19/577 |
| 2022/0007051 A1* | 1/2022 | Sethuraman | ......... | H04N 19/577 |
| 2022/0030267 A1 | 1/2022 | Zhang et al. | | |
| 2022/0060690 A1* | 2/2022 | Sethuraman | ......... | H04N 19/105 |
| 2022/0116648 A1* | 4/2022 | Sethuraman | ......... | H04N 19/109 |
| 2022/0150507 A1* | 5/2022 | Lin | ..................... | H04N 19/132 |

OTHER PUBLICATIONS

Gao H., et al., "Decoder-Side Motion Vector Refinement in VVC: Algorithm and Hardware Implementation Considerations," IEEE Transactions on Circuits and Systems for Video Technology, IEEE, USA, vol. 31, No. 8, Nov. 9, 2020, XP011870333, pp. 3197-3211, abstract Sections II and III (with sub-sections), figure 4.
International Search Report and Written Opinion—PCT/US2023/013431—ISA/EPO—dated May 23, 2023.

\* cited by examiner

DECODER-SIDE MOTION VECTOR REFINEMENT (DMVR) INTER PREDICTION USING SHARED INTERPOLATION FILTERS AND REFERENCE PIXELS

FIELD

The present disclosure generally relates to video coding (e.g., including encoding and/or decoding of video data). For example, aspects of the present disclosure relate to systems and techniques for performing inter-prediction (e.g., Decoder-Side Motion Vector Refinement (DMVR)) using shared interpolation filters and reference data.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include versatile video coding (VVC), high-efficiency video coding (HEVC), advanced video coding (AVC), MPEG-2 Part 2 coding (MPEG stands for moving picture experts group), among others, as well as proprietary video codecs/formats such as AOMedia Video 1 (AV1) developed by the Alliance for Open Media. Video coding generally utilizes prediction methods (e.g., inter-prediction, intra-prediction, or the like) that take advantage of redundancy present in video images or sequences. A goal of video coding techniques is to compress video data into a form that uses a lower bit rate, while avoiding or minimizing degradations to video quality. With ever-evolving video services becoming available, encoding techniques with better coding efficiency are needed.

SUMMARY

In some examples, systems and techniques are described for improved inter-prediction using shared interpolation filters. According to at least one illustrative example, a method of processing video data is provided. The method includes: obtaining a reference data block for predicting a block of video data; determining, using an inter-prediction processing path, one or more refined motion vectors based on the reference data block; and performing, using the inter-prediction processing path, inter-prediction for the block of video data, wherein the inter-prediction is based on the reference data block and the one or more refined motion vectors.

In another example, an apparatus for processing video data is provided that includes at least one memory (e.g., configured to store data, such as virtual content data, one or more images, etc.) and at least one processor (e.g., implemented in circuitry) coupled to the at least one memory. The at least one processor is configured to and can: obtain a reference data block for predicting a block of video data; determine, use an inter-prediction processing path, one or more refined motion vectors based on the reference data block; and perform, use the inter-prediction processing path, inter-prediction for the block of video data, wherein the inter-prediction is based on the reference data block and the one or more refined motion vectors.

In another example, a non-transitory computer-readable medium is provided that has stored thereon instructions that, when executed by one or more processors, cause the one or more processors to: obtain a reference data block for predicting a block of video data; determine, use an inter-prediction processing path, one or more refined motion vectors based on the reference data block; and perform, use the inter-prediction processing path, inter-prediction for the block of video data, wherein the inter-prediction is based on the reference data block and the one or more refined motion vectors.

In another example, an apparatus for processing video data is provided. The apparatus includes: means for obtaining a reference data block for predicting a block of video data; means for determining, using an inter-prediction processing path, one or more refined motion vectors based on the reference data block; and means for performing, using the inter-prediction processing path, inter-prediction for the block of video data, wherein the inter-prediction is based on the reference data block and the one or more refined motion vectors.

In some aspects, one or more of the methods, apparatuses, and computer-readable medium described above further comprise: determining, using a first interpolation filter, a 2-tap horizontal interpolation based on the reference data block; and determining, using a second interpolation filter, a 2-tap vertical interpolation based on the reference data block.

In some aspects, one or more of the methods, apparatuses, and computer-readable medium described above further comprise: determining a sum of absolute difference (SAD) based on the 2-tap horizontal interpolation and the 2-tap vertical interpolation; and generating the one or more refined motion vectors using the SAD and one or more original motion vectors associated with the block of video data.

In some aspects, one or more of the methods, apparatuses, and computer-readable medium described above further comprise: determining, using the first interpolation filter, an 8-tap horizontal interpolation based on the reference data block and a first refined motion vector; determining, using the second interpolation filter, an 8-tap vertical interpolation based on the reference data block and a second refined motion vector; and generating a plurality of inter-predicted pixels using the 8-tap horizontal interpolation and the 8-tap vertical interpolation.

In some aspects, one or more of the methods, apparatuses, and computer-readable medium described above further comprise: determining a weighted prediction using the 8-tap horizontal interpolation and the 8-tap vertical interpolation, wherein the weighted prediction is determined based on a sum of the 8-tap horizontal interpolation and the 8-tap vertical interpolation; and generating the plurality of inter-predicted pixels based on the weighted prediction.

In some aspects, one or more of the methods, apparatuses, and computer-readable medium described above further comprise: generating the one or more refined motion vectors based on a sum of absolute difference (SAD) determined for the 2-tap horizontal interpolation and the 2-tap vertical interpolation; wherein the SAD is determined based on a sum of the 2-tap horizontal interpolation and a negation of the 2-tap vertical interpolation.

In some aspects, one or more of the methods, apparatuses, and computer-readable medium described above further comprise: determining the weighted prediction and determine the SAD using arithmetic logic.

In some aspects, the inter-prediction processing path includes the first interpolation filter and the second interpolation filter. In some aspects, the first interpolation filter is a 2-tap 32×2 horizontal interpolation filter. In some aspects, the second interpolation filter is a 2-tap 32×2 vertical interpolation filter.

In some aspects, to determine the one or more refined motion vectors, one or more of the methods, apparatuses, and computer-readable medium described above further comprise using the inter-prediction processing path as a motion vector refinement path. In some aspects, to perform inter-prediction for the block of video data, one or more of the methods, apparatuses, and computer-readable medium described above further comprise using the inter-prediction processing path as a pixel prediction path.

In some aspects, one or more of the methods, apparatuses, and computer-readable medium described above further comprise: using the inter-prediction processing path as a motion vector refinement path by configuring the first interpolation filter to perform a 2-tap 20×2 horizontal interpolation and configuring the second interpolation filter to perform a 2-tap 20×2 vertical interpolation; and using the inter-prediction processing path as a pixel prediction path by configuring the first interpolation filter to perform an 8-tap 8×2 horizontal interpolation and configuring the second interpolation filter to perform an 8-tap 8×2 vertical interpolation.

In some aspects, one or more of the methods, apparatuses, and computer-readable medium described above further comprise: generating an encoded video bitstream comprising one or more pictures, at least one picture of the one or more pictures being based on the inter-prediction performed for the block of video data.

In some aspects, one or more of the methods, apparatuses, and computer-readable medium described above further comprise: transmitting the encoded video bitstream to a decoding device, the encoded video bitstream being transmitted with signaling information.

In some aspects, storing the encoded video bitstream.

In some aspects, one or more of the methods, apparatuses, and computer-readable medium described above further comprise: obtaining one or more encoded pictures, at least one encoded picture of the one or more encoded pictures including the block of video data; and decoding the block of video data from the at least one encoded picture.

In some aspects, one or more of the methods, apparatuses, and computer-readable medium described above further comprise: decoding the block of video data from the at least one encoded picture includes reconstructing the block of video data.

In some aspects, the apparatus is, or is part of, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a vehicle (e.g., an automobile, truck, etc., or a component or system of an automobile, truck, etc.), a personal computer, a laptop computer, a server computer, a robotics device, or other device. In some aspects, the apparatus includes radio detection and ranging (radar) for capturing radio frequency (RF) signals. In some aspects, the apparatus includes one or more light detection and ranging (LIDAR) sensors, radar sensors, or other light-based sensors for capturing light-based (e.g., optical frequency) signals. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors, which can be used for determining a location of the apparatuses, a state of the apparatuses (e.g., a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
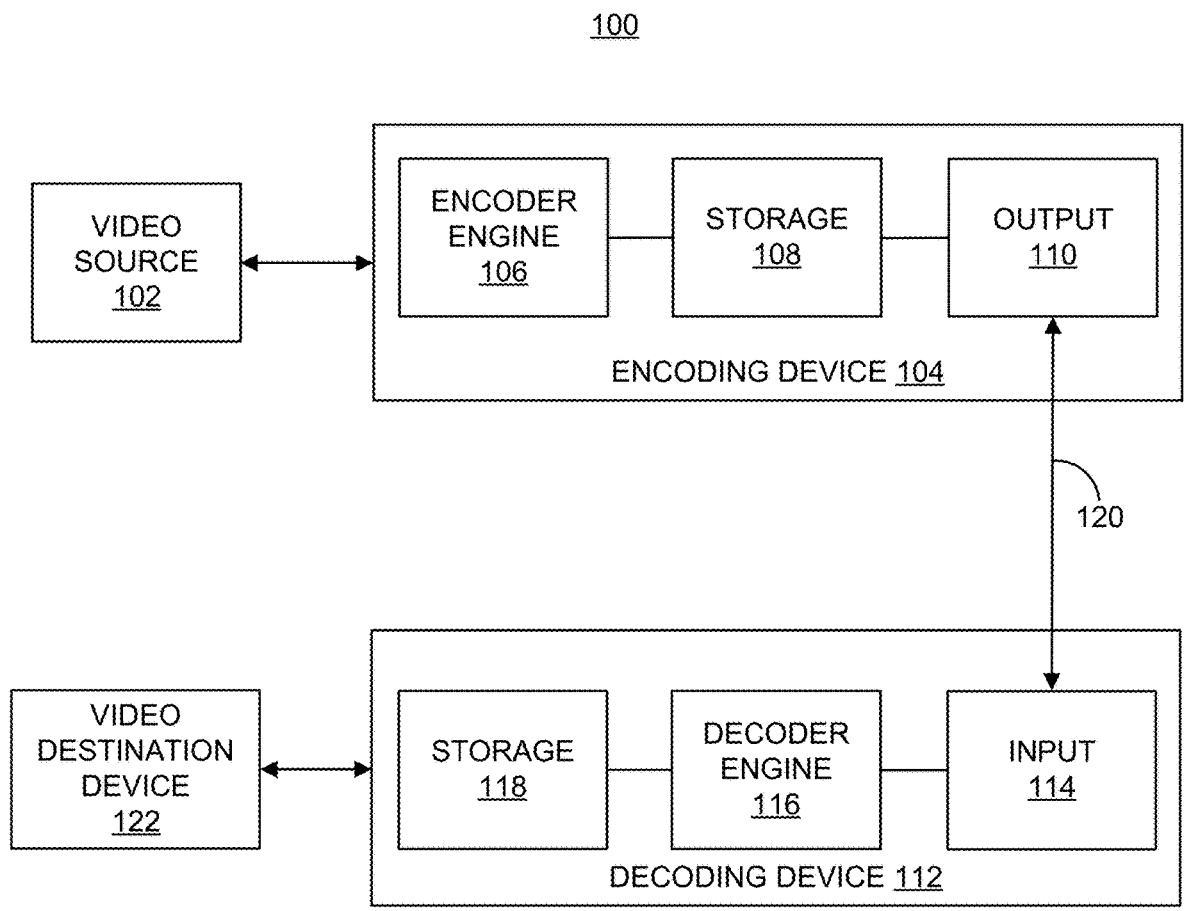
FIG. 1 is a block diagram illustrating an example of an encoding device and a decoding device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Digital video data can include large amounts of data, particularly as the demand for high quality video data continues to grow. For example, consumers of video data typically desire video of increasingly high quality, with high fidelity, resolution, frame rates, and the like. However, the large amount of video data required to meet such demands can place a significant burden on communication networks as well as on devices that process and store the video data.

Video coding devices implement video compression techniques to encode and decode video data efficiently. Video compression techniques may include applying different prediction modes, including spatial prediction (e.g., intra-frame prediction or intra-prediction), temporal prediction (e.g., inter-frame prediction or inter-prediction), inter-layer prediction (across different layers of video data), and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), coding unit (CU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy encode the quantized transform coefficients and/or the syntax elements, thereby further reducing the number of bits needed for their representation.

After entropy decoding and de-quantizing the received bitstream, a video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

Video coding can be performed according to a particular video coding standard. Examples of video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual, Advanced Video Coding (AVC) or ITU-T H.264, including its Scalable Video Coding (SVC) and Multiview Video Coding (MVC) extensions, High Efficiency Video Coding (HEVC) or ITU-T H.265, including its range and screen content coding, 3D video coding (3D-HEVC), multiview (MV-HEVC), and scalable (SHVC) extensions, Versatile Video Coding (VVC) or ITU-T H.266 and its extensions, VP9, Alliance of Open Media (AOMedia) Video 1 (AV1), Essential Video Coding (EVC), among others.

As noted above, a video encoder can partition each picture of an original video sequence into one or more smaller blocks or rectangular regions, which may then be encoded using, for example, inter-prediction (or inter-frame prediction) to remove temporal redundancy inherent to the original video sequence. If a block is encoded in an inter-prediction mode, a prediction block is formed based on previously encoded and reconstructed blocks, which are available in both the video encoder and the video decoder to form a prediction reference. For example, instead of directly encoding the pixel values for each current block (e.g., currently encoded or currently decoded), a video encoder can perform inter-prediction by searching previously encoded frames for a block that is similar to the current block. These previously encoded frames are used as reference frames. When a matching or similar block is found, the block can be encoded by a motion vector, which points to the position of the matching block in the reference frame.

When the video encoder succeeds in finding a matching block that is similar, but not identical, to the current block, the video encoder can compute the difference(s) between the matching block and the current block. These residual values can be used as a prediction error, which is transformed and provided to a video decoder. Based on a motion vector (e.g., pointing to a matched block in a reference frame) and the prediction error, the video decoder can perform inter-prediction to recover the raw pixel values for the current block.

The process of motion vector determination is called motion estimation. As described above, a video encoder can perform inter-prediction by using motion estimation to determine a motion vector, where the motion vector can be used to encode the position of a matching block in a reference frame. Accurate motion vector and/or motion information can improve inter-prediction performance at the decoder side. More accurate motion information may also be associated with an increased bitrate or otherwise occupy a larger percentage of the bitstream between the video encoder and the video decoder. In the HEVC standard and the VVC standard, a merge mode is used to reduce the bitrate required for motion vector signaling. In some examples, the merge mode may generate inaccurate motion vectors, which may cause imprecise inter-prediction.

In some cases, a video decoder can perform inter-prediction to improve coding performance. For example, a video decoder can perform Decoder-Side Motion Vector Refinement (DMVR) to refine an initial motion vector (e.g., a video decoder can perform DMVR to refine the initial motion vector from the merge mode). A video decoder can perform DMVR to generate a new or refined motion vector with an increased precision relative to that of the initial motion vector from the merge mode.

In one illustrative example, a video decoder can perform DMVR based on analyzing one or more motion prediction candidates from spatial or temporal neighboring blocks. The result of DMVR is a refined motion vector with some offset from the original motion vector (e.g., the merge mode initial motion vector received at the video decoder). In some cases, the video decoder can perform DMVR based on a search performed around the original motion vector on L0 and L1 reference frames. The search can be based on calculating distortion between L0 and L1 candidate samples. In some cases, the sum of absolute difference (SAD) can be used as a distortion metric. In some examples, the refined motion vector can be derived based on the offset with the lowest SAD. The offset can be an integer offset. In some cases, DMVR can be performed subject to a maximum integer offset (e.g., a maximum searched integer offset equal to two).

In the current VVC standard, the DMVR search area is larger than the block area (e.g., larger than the prediction block area). For example, according to the VVC standard, a video decoder can perform DMVR by using a 2-tap interpolation filter to obtain predicted pixel data values of the DMVR search area. The 2-tap interpolation is performed in each prediction direction, L0 and L1, and the predicted pixel values of the DMVR search area are generated using the original merge candidate motion vector. Because the DMVR search area depends on the pixel data that is predicted using the original motion vector, the refined motion vector prediction pipeline at the video decoder has a dependency on the pixel prediction pipeline.

In some examples of hardware implementations of DMVR inter pixel prediction, a separate motion vector refinement path is provided in addition to the pixel prediction path. Such approaches may be associated with increased latency due to performing separate pre-fetches of reference data for the motion vector refinement path and the pixel prediction path. Increased die area is needed to support the two separate prediction paths. In some cases, out-of-order prediction can be performed in an effort to reduce the latency impact of the multiple pre-fetches. Large amounts of static random-access memory (SRAM) may be needed to support out-of-order prediction, which increases power consumption and die size.

As described in more detail herein, systems, apparatuses, methods, and computer-readable media (collectively referred to as "systems and techniques") are described for providing improved inter-prediction. For example, the systems and techniques can perform inter-prediction using a shared reference data pre-fetch and a shared interpolation data path for DMVR SAD and pixel prediction. In some cases, a shared reference data pre-fetch can obtain (e.g., pre-fetch) a reference data or pixel block that is utilized by the shared interpolation data path to perform decoder-side motion vector refinement (DMVR) and to perform pixel prediction. For example, the shared reference data pre-fetch can be based at least in part on a common or same reference data that is pre-fetched and used to perform different processing tasks by the shared interpolation data path. The shared interpolation data path can be used to perform multiple (e.g., two or more) processing tasks wherein the multiple processing tasks utilize some (or all) of the same hardware components and/or processing units. For example, the shared interpolation data path can use some or all of the same interpolation filters to perform DMVR and to perform pixel prediction, wherein the shared interpolation data path performs DMVR and pixel prediction separately. For example, the shared interpolation data path can use the same hardware components and/or processing units to perform DMVR and pixel prediction in series. In some cases, the shared interpolation data path can first use the same or shared hardware components and/or processing units to perform DMVR and determine a refined motion vector; the refined motion vector can then be looped back to the input of the shared interpolation path and subsequently used to perform pixel prediction using the same or shared hardware components and/or processing units that were previously used to perform DMVR. In some examples, the shared interpolation data path can use a set of one or more interpolation filters to implement both a DMVR data path or configuration and to implement a pixel prediction data path or configuration. For example, the set of one or more interpolation filters included in the shared interpolation data path can be adjusted or configured between implementing a DMVR data path and a pixel prediction data path.

According to some aspects, the systems and techniques can include using a shared reference data pre-fetch that is sized based on a maximum possible offset between a refined motion vector and an original motion vector (e.g., from which the refined motion vector is generated). In some examples, the shared reference data pre-fetch can be obtained for a given block (e.g., PU, CU, CTU, etc.) for which inter-prediction is to be performed. When the block (e.g., PU, CU, etc.) is a DMVR block (e.g., DMVR PU etc.), decoder-side motion vector refinement can first be performed to generate one or more refined motion vectors. The refined motion vectors can be generated based on the shared reference data pre-fetch and one or more original motion vectors associated with the block (e.g., PU, CU, etc.). The refined motion vectors can subsequently be used with the underlying block (e.g., PU, CU, etc.) data (e.g., comprising a portion of the shared reference data pre-fetch) to perform inter-pixel prediction for the block. A PU will be used herein as an example of a block. However, the systems and techniques described herein can be used for other blocks (e.g., CU, CTU, TU, etc.).

In some examples, the shared interpolation data path can be used to perform DMVR or otherwise generate the refined motion vectors. The same shared interpolation data path can be used to perform inter-pixel prediction. For example, the shared interpolation data path can be configured to perform 2-tap interpolation and implement a motion vector refinement path. The shared interpolation data path can also be configured to perform 8-tap interpolation and implement an inter-pixel prediction path. When the PU is a DMVR PU, the shared interpolation data path can be used to perform motion vector refinement and inter-pixel prediction in successive fashion. In some examples, the shared interpolation data path can generate inter-pixel predictions without out-of-order prediction and/or PU re-ordering. When the PU is a non-DMVR PU, the shared interpolation data path can be used to perform inter-pixel prediction only.

Further details regarding the systems and techniques will be described with respect to the figures.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. As used herein, the term coding can refer to encoding and/or decoding. In some examples, the system 100 can support one-way or two-way video transmission to support applications such as video conferencing, video streaming, video playback, video broadcasting, gaming, and/or video telephony.

The encoding device 104 (or encoder) can be used to encode video data using a video coding standard, format, codec, or protocol to generate an encoded video bitstream. Examples of video coding standards and formats/codecs include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, High Efficiency Video Coding (HEVC) or ITU-T H.265, and Versatile Video Coding (VVC) or ITU-T H.266. Various extensions to HEVC deal with multi-layer video coding exist, including the range and screen content coding extensions, 3D video coding (3D-HEVC) and multiview extensions (MV-HEVC) and scalable extension (SHVC). The HEVC and its extensions have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG). VP9, AOMedia Video 1 (AV1) developed by the Alliance for Open Media Alliance of Open Media (AOMedia), and Essential Video Coding (EVC) are other video coding standards for which the techniques described herein can be applied.

VVC, a latest video coding standard, was developed by Joint Video Experts Team (JVET) of ITU-T and ISO/IEC to, at least in part, achieve substantial compression capability beyond HEVC for a broad range of applications. The VVC specification was finalized in July 2020 and published by both ITU-T and ISO/IEC. The VVC specification specifies normative bitstream and picture formats, high level syntax (HLS) and coding unit level syntax, the parsing process, the decoding process, etc. VVC also specifies profiles/tiers/levels (PTL) restrictions, byte stream format, hypothetical reference decoder, and supplemental enhancement information (SEI) in the annex.

The systems and techniques described herein can be applied to any of the existing video codecs (e.g., VVC, HEVC, AVC, or other suitable existing video codec), and/or can be an efficient coding tool for any video coding standards being developed and/or future video coding standards. For example, examples described herein can be performed using video codecs such as VVC, HEVC, AVC, and/or extensions thereof. However, the techniques and systems described herein may also be applicable to other coding standards, codecs, or formats, such as MPEG, JPEG (or other coding standard for still images), VP9, AV1, extensions thereof, or other suitable coding standards already available or not yet available or developed. For instance, in some examples, the encoding device 104 and/or the decoding device 112 may operate according to a proprietary video codec/format, such as AV1, extensions of AV1, and/or successor versions of AV1 (e.g., AV2), or other proprietary formats or industry standards. Accordingly, while the techniques and systems described herein may be described with reference to a particular video coding standard, one of ordinary skill in the art will appreciate that the description should not be interpreted to apply only to that particular standard.

Referring to FIG. 1, a video source 102 may provide the video data to the encoding device 104. The video source 102 may be part of the source device or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that, in some cases, is part of a video. In some examples, data from the video source 102 can be a still image that is not a part of a video. In HEVC, VVC, and other video coding specifications, a video sequence can include a series of pictures. A picture may include three sample arrays, denoted SL, SCb, and SCr. SL is a two-dimensional array of luma samples, SCb is a two-dimensional array of Cb chrominance samples, and SCr is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably. With respect to example techniques described herein that refer to individual samples for illustrative purposes, the same techniques can be applied to pixels (e.g., all three sample components for a given location in an array of a picture). With respect to example techniques described herein that refer to pixels (e.g., all three sample components for a given location in an array of a picture) for illustrative purposes, the same techniques can be applied to individual samples.

The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random-access point picture in the base layer and with certain properties up to and not including a next AU that has a random-access point picture in the base layer and with certain properties. For example, the certain properties of a random-access point picture that starts a CVS may include a RASL flag (e.g., NoRaslOutputFlag) equal to 1. Otherwise, a random-access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are partitioned into coding tree blocks (CTBs) of luma samples and chroma samples. A CTB of luma samples and one or more CTBs of chroma samples, along with syntax for the samples, are referred to as a coding tree unit (CTU). A CTU may also be referred to as a "tree block" or a "largest coding unit" (LCU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which a residual transform (e.g., the same two-dimensional transform in some cases) is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may be quantized by the encoder engine 106.

Once the pictures of the video data are partitioned into CUs, the encoder engine 106 predicts each PU using a prediction mode. The prediction unit or prediction block is subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

The encoder engine 106 and the decoder engine 116 (described in more detail below) may be configured to operate according to VVC. According to VVC, a video coder (such as the encoder engine 106 and/or the decoder engine 116) partitions a picture into a plurality of coding tree units (CTUs) (where a CTB of luma samples and one or more CTBs of chroma samples, along with syntax for the samples, are referred to as a CTU). The video coder can partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels, including a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree partition, a binary tree partition, and one or more types of triple tree partitions. A triple tree partition is a partition where a block is split into three sub-blocks. In some examples, a triple tree partition divides a block into three sub-blocks without dividing the original block through the center. The partitioning types in MTT (e.g., quadtree, binary tree, and tripe tree) may be symmetrical or asymmetrical.

When operating according to the AV1 codec, encoding device 104 and decoding device 112 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Encoding device 104 may further partition a superblock into smaller coding blocks. Encoding device 104 may partition a superblock and other coding blocks into smaller blocks using square or non-square partitioning. Non-square blocks may include N/2×N, N×N/2, N/4×N, and N×N/4 blocks. Encoding device 104 and decoding device 112 may perform separate prediction and transform processes on each of the coding blocks.

AV1 also defines a tile of video data. A tile is a rectangular array of superblocks that may be coded independently of other tiles. That is, encoding device 104 and decoding device 112 may encode and decode, respectively, coding blocks within a tile without using video data from other tiles. However, encoding device 104 and decoding device 112 may perform filtering across tile boundaries. Tiles may be uniform or non-uniform in size. Tile-based coding may enable parallel processing and/or multi-threading for encoder and decoder implementations.

In some examples, the encoding device 104 and decoding device 112 can use a single QTBT or MTT structure to represent each of the luminance and chrominance components, while in other examples, the video coder can use two or more QTBT or MTT structures, such as one QTBT or MTT structure for the luminance component and another QTBT or MTT structure for both chrominance components (or two QTBT and/or MTT structures for respective chrominance components).

The encoding device 104 and decoding device 112 can be configured to use quadtree partitioning per HEVC, QTBT partitioning, MTT partitioning, or other partitioning structures.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

As noted above, intra-picture prediction utilizes the correlation between spatially neighboring samples within a picture. There is a plurality of intra-prediction modes (also referred to as "intra modes"). In some examples, the intra prediction of a luma block includes 35 modes, including the Planar mode, DC mode, and 33 angular modes (e.g., diagonal intra-prediction modes and angular modes adjacent to the diagonal intra-prediction modes). The encoding device 104 and/or the decoding device 112 may select the prediction mode for each block that minimizes the residual between the prediction block and the block to be encoded (e.g., based on a Sum of Absolute Errors (SAE), Sum of Absolute Differences (SAD), Sum of Absolute Transformed Differences (SATD), or other measure of similarity). For instance, the SAE can be calculated by taking the absolute difference between each pixel (or sample) in the block to be encoded and the corresponding pixel (or sample) in the prediction block being used for comparison. The differences of the pixels (or samples) are summed to create a metric of block similarity, such as the L1 norm of the difference image, the Manhattan distance between two image blocks, or other calculation. Using SAE as an example, the SAE for each prediction using each of the intra-prediction modes indicates the magnitude of the prediction error. The intra-prediction mode that has the best match to the actual current block is given by the intra-prediction mode that gives the smallest SAE.

The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

| Specification of intra-prediction mode and associated names | |
| --- | --- |
| Intra-prediction mode | Associated name |
| 0 | INTRA_PLANAR |
| 1 | INTRA_DC |
| 2 . . . 34 | INTRA_ANGULAR2 . . . INTRA_ANGULAR34 |

Inter-picture prediction uses the temporal correlation between pictures in order to derive a motion-compensated prediction for a block of image samples. Using a translational motion model, the position of a block in a previously decoded picture (a reference picture) is indicated by a motion vector ($\Delta x$, $\Delta y$), with $\Delta x$ specifying the horizontal displacement and $\Delta y$ specifying the vertical displacement of the reference block relative to the position of the current block. In some cases, a motion vector ($\Delta x$, $\Delta y$) can be in integer sample accuracy (also referred to as integer accuracy), in which case the motion vector points to the integer-pel grid (or integer-pixel sampling grid) of the reference frame. In some cases, a motion vector ($\Delta x$, $\Delta y$) can be of fractional sample accuracy (also referred to as fractional-pel accuracy or non-integer accuracy) to more accurately capture the movement of the underlying object, without being restricted to the integer-pel grid of the reference frame. Accuracy of motion vectors may be expressed by the quantization level of the motion vectors. For example, the quantization level may be integer accuracy (e.g., 1-pixel) or fractional-pel accuracy (e.g., ¼-pixel, ½-pixel, or other sub-pixel value). Interpolation is applied on reference pictures to derive the prediction signal when the corresponding motion vector has fractional sample accuracy. For example, samples available at integer positions can be filtered (e.g., using one or more interpolation filters) to estimate values at fractional positions. The previously decoded reference picture is indicated by a reference index (refIdx) to a reference picture list. The motion vectors and reference indices can be referred to as motion parameters. Two kinds of inter-picture prediction can be performed, including uni-prediction and bi-prediction.

With inter-prediction using bi-prediction (also referred to as bi-directional inter-prediction), two sets of motion parameters ($\Delta x_0$, $y_0$, $refIdx_0$ and $\Delta x_1$, $y_1$, $refIdx_1$) are used to generate two motion compensated predictions (from the same reference picture or possibly from different reference pictures). For example, with bi-prediction, each prediction block uses two motion compensated prediction signals, and generates B prediction units. The two motion compensated predictions are combined to get the final motion compensated prediction. For example, the two motion compensated predictions can be combined by averaging. In another example, weighted prediction can be used, in which case different weights can be applied to each motion compensated prediction. The reference pictures that can be used in bi-prediction are stored in two separate lists, denoted as list 0 and list 1. Motion parameters can be derived at the encoding device 104 using a motion estimation process.

With inter-prediction using uni-prediction (also referred to as uni-directional inter-prediction), one set of motion parameters ($\Delta x_0$, $y_0$, $refIdx_0$) is used to generate a motion compensated prediction from a reference picture. For example, with uni-prediction, each prediction block uses at most one motion compensated prediction signal, and generates P prediction units.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, encoding device 104 and decoding device 112 do not use video data from other frames of video data. For most intra prediction modes, the video encoding device 104 encodes blocks of a current frame based on the difference between sample values in the current block and predicted values generated from reference samples in the same frame. The video encoding device 104 determines predicted values generated from the reference samples based on the intra prediction mode.

After performing prediction using intra- and/or inter-prediction, the encoding device 104 can perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and may be quantized and scanned using TUs to produce serialized transform coefficients for entropy coding.

In some examples, following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. The encoder engine 106 may form the TUs including the residual data for the CU, and may transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may be entropy encoded by the encoder engine 106. In some examples, the encoder engine 106 may utilize a predefined scan order to scan the quantized transform coefficients to produce a serialized vector that can be entropy encoded. In some examples, the encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video bitstream data over the communication link 120 to the decoding device 112 of the receiving device. The input 114 of the decoding device 112 may receive the NAL units. The communication link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in a storage 108. The output 110 may retrieve the encoded video bitstream data from the encoder engine 106 or from the storage 108. The storage 108 may include any of a variety of distributed or locally accessed data storage media. For example, the storage 108 may include a hard drive, a storage disc, flash memory, volatile or non-volatile memory, or any other suitable digital storage media for storing encoded video data. The storage 108 can also include a decoded picture buffer (DPB) for storing reference pictures for use in inter-prediction. In a further example, the storage 108 can correspond to a file server or another intermediate storage device that may store the encoded video generated by the source device. In such cases, the receiving device including the decoding device 112 can access stored video data from the storage device via streaming or download. The file server may be any type of server capable of storing encoded video data and transmitting that encoded video data to the receiving device. Example file servers include a web server (e.g., for a website), an FTP server, network attached storage (NAS) devices, or a local disk drive. The receiving device may access the encoded video data through any standard data connection, including an Internet connection, and may include a wireless channel (e.g., a Wi-Fi connection), a wired connection (e.g., DSL, cable modem, etc.), or a combination of both that is suitable for accessing encoded video data stored on a file server. The transmission of encoded video data from the storage 108 may be a streaming transmission, a download transmission, or a combination thereof.

The input 114 of the decoding device 112 receives the encoded video bitstream data and may provide the video bitstream data to the decoder engine 116, or to the storage 118 for later use by the decoder engine 116. For example, the storage 118 can include a DPB for storing reference pictures for use in inter-prediction. The receiving device including the decoding device 112 can receive the encoded video data to be decoded via the storage 108. The encoded video data may be modulated according to a communication standard, such as a wireless communication protocol, and transmitted to the receiving device. The communication medium for transmitted the encoded video data can comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device to the receiving device.

The decoder engine 116 may decode the encoded video bitstream data by entropy decoding (e.g., using an entropy decoder) and extracting the elements of one or more coded video sequences making up the encoded video data. The decoder engine 116 may rescale and perform an inverse transform on the encoded video bitstream data. Residual data is passed to a prediction stage of the decoder engine 116. The decoder engine 116 predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 8. An example of specific details of the decoding device 112 is described below with reference to FIG. 9.

The example system shown in FIG. 1 is one illustrative example that can be used herein. Techniques for processing video data using the techniques described herein can be performed by any digital video encoding and/or decoding device. Although generally the techniques of this disclosure are performed by a video encoding device or a video decoding device, the techniques may also be performed by a combined video encoder-decoder, typically referred to as a "CODEC." Moreover, the techniques of this disclosure may also be performed by a video preprocessor. The source device and the receiving device are merely examples of such coding devices in which the source device generates coded video data for transmission to the receiving device. In some examples, the source and receiving devices may operate in a substantially symmetrical manner such that each of the devices include video encoding and decoding components. Hence, example systems may support one-way or two-way video transmission between video devices, e.g., for video streaming, video playback, video broadcasting, or video telephony.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers can represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. In some examples, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

This disclosure may generally refer to "signaling" certain information, such as syntax elements. The term "signaling" may generally refer to the communication of values for syntax elements and/or other data used to decode encoded video data. For example, the video encoding device 104 may signal values for syntax elements in the bitstream. In general, signaling refers to generating a value in the bitstream. As noted above, video source 102 may transport the bitstream to video destination device 122 substantially in real time, or not in real time, such as might occur when storing syntax elements to storage 108 for later retrieval by the video destination device 122.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

As noted above, a video encoder (e.g., encoding device 104) and/or a video decoder (e.g., decoding device 112) can perform Decoder-Side Motion Vector Refinement (DMVR) based on analyzing one or more motion prediction candidates from spatial or temporal neighboring blocks. The result of DMVR is a refined motion vector with some offset from the original motion vector (e.g., a merge mode initial motion vector). In some cases, the video encoder and/or decoder can perform DMVR based on a search performed around the original motion vector on L0 and L1 reference frames. The searching can include calculating distortion between L0 and L1 candidate samples, with the sum of absolute difference (SAD) used as a distortion metric. In some examples, the refined motion vector can be derived based on identifying an integer offset with the lowest SAD. In some cases, the video encoder and/or video decoder can perform DMVR using a maximum integer offset of two. In the current VVC standard, the DMVR search area is larger than the block area (e.g., larger than the prediction block area). For example, according to the VVC standard, a video decoder can perform DMVR by using a 2-tap interpolation filter to obtain predicted pixel data values of the DMVR search area. The 2-tap interpolation is performed in each prediction direction, L0 and L1, and the predicted pixel values of the DMVR search area are generated using the original merge candidate motion vector. Because the DMVR search area depends on the pixel data that is predicted using the original motion vector, the refined motion vector prediction pipeline at the video decoder has a dependency on the pixel prediction pipeline.

Figure 2:
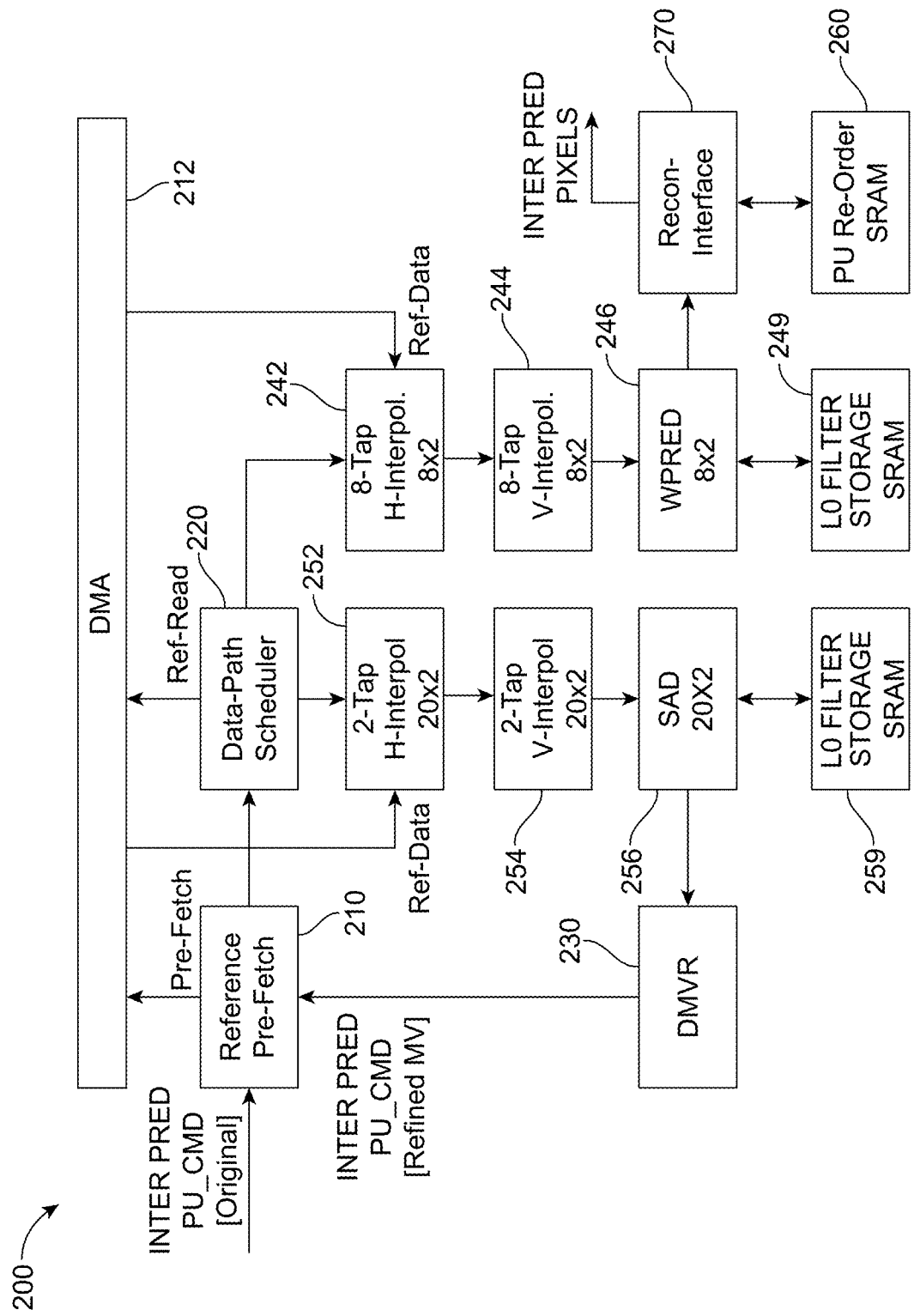
FIG. 2 is a block diagram illustrating an example of a Decoder-Side Motion Vector Refinement (DMVR)-capable inter pixel prediction data path, in accordance with some examples.

FIG. 2 illustrates an example diagram 200 of a DMVR-capable inter pixel prediction data path. The DMVR-capable inter pixel prediction data path (also referred to as a "pipeline") can include a reference pre-fetch block 210 which receives as input a stream of inter-prediction prediction unit (PU) commands, indicated in FIG. 2 as 'INTER PRED PU_CMD [Original]'. The inter-prediction PU commands can each include an original motion vector associated with a PU. For example, the original motion vector can be obtained or received from a motion vector prediction block. In some cases, the original motion vector included in an inter-prediction PU command can be a merge mode motion vector (e.g., generated by a video encoder). In some examples, the inter-prediction mode is bi-predictional in the L0 and L1 prediction directions. The inter-prediction PU command can include a first motion vector MVL0 for the L0 direction of prediction and a second motion vector MVL1 for the L1 direction of prediction. Each prediction block (e.g., PU) can have a block size of SbW×SbH, where SbW represents a sub-block width and SbH represents a sub-block height. According to the VVC standard, the prediction block (e.g., PU) size can be 16×16, 16×8, or 8×16. The following discussion makes reference to an example based on a 16×16 prediction unit, although it is noted that one or more different block sizes can be utilized, as mentioned above.

The inter-prediction PU commands can include a combination of DMVR PUs and non-DMVR PUs. As will be explained in greater depth below, DMVR can be performed to generate a refined motion vector for a DMVR PU prior to inter-pixel prediction (e.g., inter-pixel prediction is performed using a refined motion vector), while non-DMVR PUs may proceed directly to inter-pixel prediction (e.g., inter-pixel prediction is performed using the original motion vector).

As illustrated, the DMVR-capable inter pixel prediction pipeline 200 includes a motion vector refinement path and a pixel prediction path. The motion vector refinement path (also referred to as "DMVR SAD path") includes at least the 2-tap interpolation filters 252 and 254, a SAD block 256, and a DMVR block 230. In some examples, the 2-tap interpolation filter 252 can be a 2-tap horizontal interpolation filter and the 2-tap interpolation filter 254 can be a 2-tap vertical interpolation filter.

The pixel prediction path includes at least the 8-tap interpolation filters 242 and 244, a weighted prediction block 246, and a reconstruction interface 270. In some examples, the 8-tap interpolation filter 242 can be an 8-tap horizontal interpolation filter and the 8-tap interpolation filter 244 can be an 8-tap vertical interpolation filter. DMVR PUs can be provided first to the motion vector refinement path, and then looped back to the input of the pixel prediction path. Non-DMVR PUs can be provided directly to the pixel prediction path, without passing through the motion vector refinement path.

As mentioned previously, the reference pre-fetch block 210 receives as input a stream of inter-prediction PU commands. In response to receiving an inter-prediction PU command, reference pre-fetch block 210 can communicate with a direct memory access (DMA) controller or interface 212 to perform or request a reference data pre-fetch for the inter-prediction PU command. In some examples, the size of the reference data pre-fetch can be based on the type (e.g., DMVR, non-DMVR) of the inter-prediction PU command and/or the currently processed components (e.g., luma, chroma) of the inter-prediction PU command. In one illustrative example, reference pre-fetch block 210 first obtains a 16×16 luma DMVR prediction unit, followed by the 16×16 chroma components of this prediction unit, which is then followed by a sequence of non-DMVRE prediction units and their corresponding chroma prediction units. This sequence of prediction units will be discussed in turn below.

Beginning with the example of a 16×16 luma DMVR PU, reference pre-fetch block 210 initiates a pre-fetch request or pre-fetch communication with the DMA 212 (e.g., indicated as 'Pre-Fetch' in FIG. 2), requesting a 24×24 block of reference data for the L0 direction and for the L1 directions. In some cases, reference pre-fetch block 210 requests a 24×24 block of reference data because the 2-tap interpolation filters 252 and 254 operate over an extended range of ±2 relative to the 16×16 PU input (e.g., yielding 20×20) and the SAD block 256 introduces a further extension of ±2 (e.g., yielding 24×24). After transmitting the pre-fetch request to DMA 212, the reference pre-fetch block 210 can provide a data-path scheduler 220 with an indication or identifier of the particular PU for which the pre-fetch request was transmitted to DMA 212. Reference pre-fetch block 210 can then continue to pipeline pre-fetch requests to DMA 212 for the incoming, subsequent prediction units that follow the 16×16 luma DMVR PU (e.g., in this example, which are chroma or non-DMVR).

DMA 212 can obtain the requested data based on the pre-fetch request received from reference pre-fetch block 210 and may store the fetched data in a cache and/or first-in-first-out (FIFO) buffer. Because DMA 212 may be associated with a relatively long latency between receiving a pre-fetch request and subsequently delivering the fetched items or data into a cache/FIFO, reference pre-fetch block 210 can time the transmission of pre-fetch requests such that the DMA 212 loads the requested data into a cache/FIFO prior to the time at which data-path scheduler 220 transmits a reference data read request to DMA 212. In some examples, DMA 212 can transmit to the data-path scheduler 220 an indication that a pre-fetch has been completed for a given block or PU.

For the 16×16 luma DMVR prediction unit, data-path scheduler 220 reads the 24×24 reference data for the SAD calculation of DMVR from DMA 212, as was discussed previously. The reference data read operation is indicated as 'Ref-Read' in FIG. 2. Data-path scheduler 220 can then schedule the reference data into the motion vector refinement path. For example, in the motion vector refinement path, the 24×24 reference data for the luma DMVR prediction unit is provided to a first interpolation filter 252, shown here as a 2-tap horizontal 20×2 interpolation filter, and a second interpolation filter 254, shown here as a 2-tap vertical 20×2 interpolation filter.

Using the first and second 2-tap interpolation filters 252 and 254, the motion vector refinement path generates a 20×20 block for the 16×16 luma DMVR prediction unit. For a given input of an SbW×SbH luma DMVR prediction unit, the motion vector refinement path can apply the interpolation filters 252 and 254 to generate an interpolated block of size (SbW+4)×(SbH+4). For example, recalling that the VVC specification provides for 16×16, 16×8, or 8×16 luma size blocks for DMVR inter-prediction, the interpolation filters 252 and 254 may additionally be used to produce interpolated blocks of size 20×12 (e.g., for a 16×8 luma DMVR input) or 12×20 (e.g., for an 8×16 luma DMVR input). In some examples, the motion vector refinement path uses the first and second interpolation filters 252 and 254 to generate a first 20×20 array DPred0 for the L0 prediction direction and a second 20×20 array DPred1 for the L1 prediction direction.

The SAD block 256 generates a SAD (e.g., sum of absolute difference) array based on receiving DPred0 and DPred1 as input. For example, SAD block 256 can generate a DSAD of dimension 24×24.

Based on the DSAD generated by SAD block 256, the DMVR block 230 refines the original motion vectors MVL0 and MVL1 that are associated with the 16×16 luma DMVR prediction unit that was provided to the motion vector refinement path as input. In some examples, the original motion vectors MVL0 and MVL1 are refined to generate new motion vectors DMVL0 and DMVL1, which in some cases may be generated to have an offset of no more than ±2 pixels relative to the original motion vectors MVL0 and MVL1, respectively, in the x-direction and the y-direction.

The output of the DMVR block 230 is the output of the motion vector refinement path (e.g., the two refined motion vectors DMVL0 and DMVL1), indicated in FIG. 2 as 'INTER PRED PU_CMD [Refined MV]'. As illustrated, the refined motion vectors are provided to the reference pre-fetch block 210. In some examples, the original 16×16 luma DMVR prediction unit can then be looped back to the reference pre-fetch block 210 and combined with the refined motion vectors that were generated for the original 16×16 luma DMVR prediction unit. The original 16×16 luma DMVR block and its refined motion vectors can then be treated as a normal (e.g., non-DMVR) prediction unit, using the refined motion vectors instead of the original motion vectors, and is scheduled into the pixel prediction path 242, 244, 246, 270.

The pixel prediction path can be used to perform inter-prediction for the input PUs. Inter-prediction may be performed in the same manner for DMVR PUs (e.g., having refined motion vectors generated by the refined motion vector path) and for non-DMVR PUs (e.g., still having their original motion vectors). The pixel prediction path can include a first 8-tap interpolation filter 242, shown here as an 8-tap horizontal 8×2 interpolation filter, and a second 8-tap interpolation filter 244, shown here as an 8-tap vertical 8×2 interpolation filter. As mentioned previously, the pixel prediction path can operate over the original input size of each PU, SbW×SbH. The pixel prediction path can apply the first and second 8-tap interpolation filters 242 and 244 to generate PredL0 and PredL1 blocks of size SbW×SbH for the prediction directions L0 and L1, respectively.

In the context of the previous example of a 16×16 luma DMVR block that is looped back to reference pre-fetch block 210 and input to the pixel prediction path in combination with the refined motion vectors DMVL0 and DMVL1 generated by the motion vector refinement path, the pixel prediction path uses the refined motion vectors to generate the PredL0 and PredL1 blocks. When the pixel prediction path receives as input a non-DMVR block, the PredL0 and PredL1 blocks are generated (e.g., using the two 8-tap interpolation filters 242 and 244) using the original motion vectors MVL0 and MVL1.

The final predicted block for an inter-prediction PU is then determined as a combination of PredL0 and PredL1 and is a block of size SbW×SbH. For example, the 16×16 luma DVMR block will yield a final predicted luma block of size 16×16. The corresponding 16×16 chroma block associated with this luma block will yield a final predicted chroma block also of size 16×16, although the chroma block can be processed using only the pixel prediction path (e.g., chroma blocks can be provided directly to the pixel prediction path even if their corresponding luma blocks are provided to the motion vector refinement path). In some examples, the prediction of chroma components PredCb and PredCr can be obtained using a pixel prediction path in the same manner as described above with respect to luma components but using a 4-tap interpolation filter rather than the 8-tap interpolation filters 242 and 244, and using the original motion vectors MVL0 and MVL1 rather than the refined motion vectors DMVL0 and DMVL1.

In one illustrative example, the final predicted block for an inter-prediction PU can be determined as a combination of PredL0 and PredL1 using a weighted prediction block 246, shown here as an 8×2 weighted prediction. Weighted prediction 246 can perform a weighted prediction that is calculated as a weighted average of L0 and L1.

As illustrated in FIG. 2, the pixel prediction path additionally includes a reconstruction interface 270, which receives a weighted prediction from the weighted prediction block 246 and communicates with a PU re-order SRAM 260. The PU Re-order SRAM 260 is provided at the inter-predicted pixels reconstruction interface to accommodate out-of-order processing of the PUs that follow a luma DMVR PU. Recalling that the currently discussed example makes reference to a sequence in which reference pre-fetch block 210 first fetches a 16×16 luma DMVR block, followed by the corresponding 16×16 chroma (non-DMVR) block and/or additional non-DMVR blocks, in some examples out-of-order pixel prediction is performed. For example, out-of-order pixel prediction can occur when a DMVR block (e.g., the 16×16 luma DMVR block) is provided to the motion vector refinement path; while motion vector refinement is being performed, reference pre-fetch block 210 and/or data-path scheduler 220 can obtain the next non-DMVR block (e.g., in the input stream of inter-prediction PU commands) and provide the next non-DMVR block to the pixel prediction path. The pixel prediction path subsequently processes the next, non-DMVR block in parallel with the current, DMVR luma block.

In some examples, the use of the motion vector refinement path to compute refined motion vectors for luma or other DMVR blocks can introduce out-of-order pixel prediction. The out-of-order pixel prediction can be reversed using the aforementioned PU re-order SRAM 260, which can store or otherwise buffer any pixel prediction results that are output by the pixel prediction path in an out-of-order fashion. For example, PU re-order SRAM 260 can store or buffer the out-of-order pixel predictions generated for a 16×16 chroma non-DMVR blocks while the corresponding 16×16 luma DMVR block is processed through the pixel prediction pipeline. Reconstruction interface 270 can subsequently re-order or re-sequence the out-of-order pixel predictions stored in PU re-order SRAM 260, to thereby generate a properly ordered output of inter-predicted pixel values (e.g., an output of inter-predicted pixels). In some cases, the size of the PU-reorder SRAM 260 can depend on the pre-fetch latency of the refined motion vector prediction unit processing. For example, this can be the pre-fetch latency associated with looping a DMVR PU and its calculated refined motion vectors back to the reference pre-fetch block 210 and/or the pre-fetch latency associated with reference pre-fetch block 210 performing an additional (e.g., second) reference data pre-fetch from DMA 212. The second reference data pre-fetch from DMA 212 can correspond to the reference data needed to process the DMVR PU through the pixel prediction path; the first reference data pre-fetch from DMA 212 can correspond to the reference data needed to previously process the DMVR PU through the motion vector refinement path.

Figure 3:
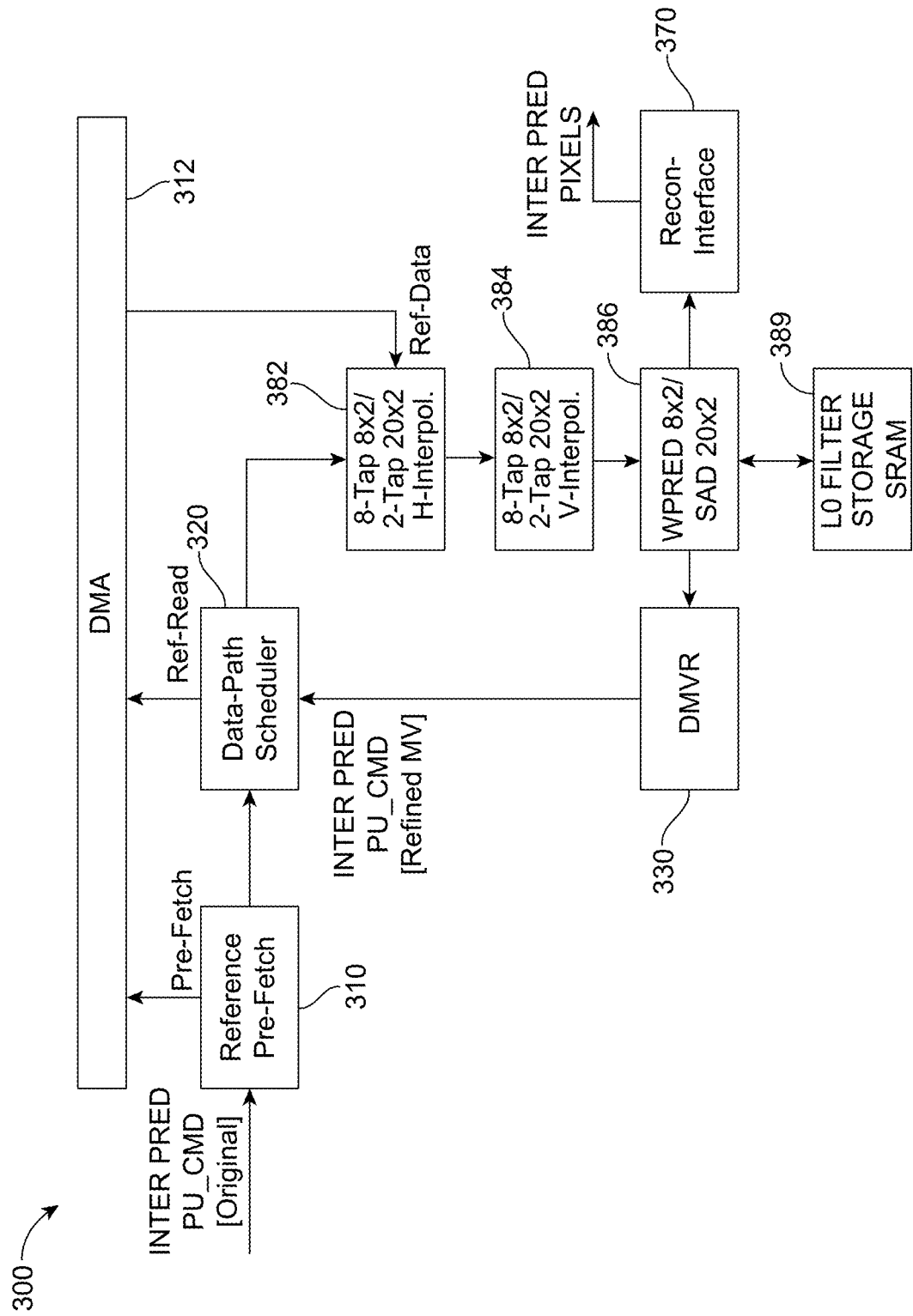
FIG. 3 is a block diagram illustrating an example of an improved DMVR-capable inter pixel prediction data path, in accordance with some examples.

FIG. 3 illustrates an example diagram 300 of an improved DMVR inter pixel prediction data path. As illustrated, the improved DMVR inter pixel prediction data path includes at least a first shared interpolation filter 382 and a second shared interpolation filter 384. In one illustrative example, the first and second shared interpolation filters 382 and 384 can be provided as a shared 2-tap 32×2 horizontal interpolation filter and a shared 2-tap 32×2 vertical interpolation filter, respectively. In some examples, the first and second shared interpolation filters 382 and 384 can be included in a shared DMVR-SAD and pixel prediction path (also referred to as a shared inter-prediction processing path). The shared DMVR-SAD and pixel prediction path (e.g., shared inter-prediction processing path) includes the first and second shared interpolation filters 382 and 384, a shared weighted prediction and SAD block 386, and a DMVR block 330. As will be explained in greater depth below, in some examples the shared weighted prediction and SAD block 386 can include one or more shared arithmetic units, shared logic units, shared arithmetic logic units, etc.

In one illustrative example, the DMVR block 330 can be the same as or similar to the DMVR block 230 of FIG. 2. In one illustrative example, the 2-tap 32×2 shared horizontal interpolation filter 382 can be used to provide the 2-tap 20×2 horizontal interpolation filter 252 and the 8-tap 8×2 horizontal interpolation filter 242, both illustrated in FIG. 2. The 2-tap 32×2 shared vertical interpolation filter 384 can be used to provide the 2-tap 20×2 vertical interpolation filter 254 and the 8-tap 8×2 vertical interpolation filter 244, both illustrated in FIG. 2.

For example, the first and second 2-tap 32×2 shared interpolation filters 382 and 384 can each include a plurality of interpolation logic units that can be reconfigured or redistributed to perform a 2-tap 20×2 interpolation and an 8-tap 8×2 interpolation as needed. For example, the 2-tap 32×2 shared interpolation filters 382 and 384 can each include 2*32=64 interpolation logic units. To perform the 2-tap 20×2 interpolation associated with the motion vector refinement path, 24 of the interpolation logic units can remain inactive (e.g., 64−2*20=24). To perform the 8-tap 8×2 interpolation associated with the pixel prediction path, all 64 of the interpolation logic units can be active, reconfigured from the 2-tap 32×2 configuration to an 8-tap 8×2 configuration (e.g., 2*32=64=8*8).

By providing the first and second 2-tap 32×2 shared interpolation filters 382 and 384, the improved DMVR pixel prediction architecture 300 can be selectively configured to perform, with a single processing path or pipeline, the motion vector refinement processing tasks (e.g., for DMVR PUs) and the pixel prediction processing tasks (e.g., for all PUs, DMVR or non-DMVR) that were performed using two separate processing paths in the approach of FIG. 2. By transforming between 8-tap 8×2 interpolation filters and 2-tap 32×2 interpolation filters, the two shared interpolation filters 382 and 384 can be re-used for dual functionality to implement motion vector refinement processing and pixel prediction processing in a single pipeline.

The shared interpolation filter logic can improve inter-prediction performance and efficiency, for example by reducing die size and/or providing better alignment with hardware implementation limits that limit the number of pixels that can be interpolated in a single clock cycle. For example, the improved DMVR pixel prediction architecture 300 can eliminate the dedicated 2-tap horizontal and vertical filters used in the dedicated DMVR interpolation path for SAD (e.g., the dedicated 2-tap horizontal interpolation filter 252 and 2-tap vertical interpolation filter 254 illustrated in FIG. 2). The improved DMVR pixel prediction architecture 300 can perform inter-prediction with DMVR at a lower power consumption (due to fewer hardware, logic, circuit, etc., components), a lower die size, and a lower silicon cost.

In one illustrative example, the improved DMVR pixel prediction architecture 300 can perform inter-prediction with DMVR without a re-ordering step, because the improved DMVR pixel prediction architecture 300 can avoid out-of-order pixel prediction. For example, a 16×16 luma DMVR block can be processed through the shared pipeline first configured to perform motion vector refinement (e.g., the shared interpolation filters 382 and 384 are configured to perform a 2-tap 20×2 horizontal interpolation and a 2-tap 20×2 vertical interpolation, respectively). The interpolated output of the 20×2 horizontal and vertical interpolation can include the same 20×20 DPred0 and DPred1 arrays described previously with respect to FIG. 2.

The DPred0 and DPred1 arrays can then be provided to the shared weighted prediction and SAD block 386. When the shared pipeline of FIG. 3 is configured to perform motion vector refinement, the shared weighted prediction and SAD block 386 can be configured to calculate the SAD array DSAD from DPred0 and DPred1 (e.g., as described with respect to FIG. 2). Shared weighted prediction and SAD block 386 can implement shared logic between the weighted prediction operation (which takes a sum of inputs) and the SAD operation (which takes a difference of inputs), by negating one of the input values provided to the shared block 386. For example, negating one of DPred0 and DPred1 and then summing the two values at shared weighted prediction and SAD block 386 is equivalent to taking the difference between DPred0 and DPred1 (and SAD is the sum of absolute difference). In some examples, the shared weighted prediction and SAD block 386 can include one or more shared arithmetic units, shared logic units, shared arithmetic logic units, etc., for summing the inputs of the weighted prediction operation and summing the inputs (e.g., with one negated) of the SAD operation.

In one illustrative example, the improved DMVR pixel prediction architecture 300 can avoid out-of-order pixel prediction by configuring the first and second shared interpolation filters 382 and 384 to perform the 2-tap 20×2 interpolation of the interpolation filters 252 and 254 of FIG. 2, and by configuring the shared weighted prediction and SAD block 386 to perform the SAD calculation of the SAD block 256 of FIG. 2. Returning to the example of the 16×16 luma DMVR PU, reference pre-fetch block 310, data-path scheduler 320, and DMA 312 (which can be the same as or similar to the respective components in FIG. 2) can first provide the 16×16 luma DMVR PU to the shared processing pipeline of 382, 384, 386, 330 (e.g., the shared inter-prediction processing path). DMVR block 330 generates and returns the refined motion vectors for the 16×16 luma DMVR PU to the data-path scheduler 320. Data-path scheduler 320 can then configure the shared inter-prediction processing path to perform pixel prediction based on the refined motion vectors. Because motion vector refinement and pixel prediction are performed sequentially and using the same shared hardware and processing pipeline, out-of-order pixel prediction can be avoided and the PU re-order SRAM 260 (e.g., which can include a large amount of SRAM) of FIG. 2 may be removed.

In some examples, the improved DMVR pixel prediction architecture 300 can use a shared reference data pre-fetch between the motion vector refinement operations and the pixel prediction operations. For example, the reference pre-fetch block 310 can perform a single reference data pre-fetch (e.g., from DMA 312) that is sufficiently large for use in both the DMVR SAD configuration of the shared inter-prediction processing path of architecture 300 and for use in the subsequent pixel prediction configuration of the shared inter-prediction processing path of architecture 300. By sharing a reference data pre-fetch between consecutive motion vector refinement and pixel prediction operations, the pre-fetch latency contributed by DMA 312 can be reduced (e.g., halved) against that of the system illustrated in FIG. 2.

In one illustrative example, the reference pre-fetch block 310 can request or pre-fetch from DMA 312 a 27×27 block of reference data (e.g., an increase from the example 24×24 pre-fetch reference data block size discussed with respect to FIG. 2). Because the maximum change of the refined motion vectors from the original motion vectors may be limited to the range of −2 to +2 pixels, the 27×27 reference data pre-fetch block size may be sufficiently large for both the initial motion vector refinement (e.g., which utilizes a 24×24 block size) and a subsequent pixel prediction using the refined motion vectors (e.g., because the refined motion vectors can be limited to a range of ±2).

As illustrated, the output of refined motion vectors (e.g., generated by DMVR block 330) can be provided directly to the data-path scheduler 320 because an additional reference data pre-fetch is not performed between the motion vector refinement processing and the subsequent pixel prediction processing performed using the shared inter-prediction processing path (e.g., the same 27×27 reference data pre-fetch associated with the motion vector refinement processing will be reused by data-path scheduler 320 to schedule the pixel prediction processing).

Figure 4:
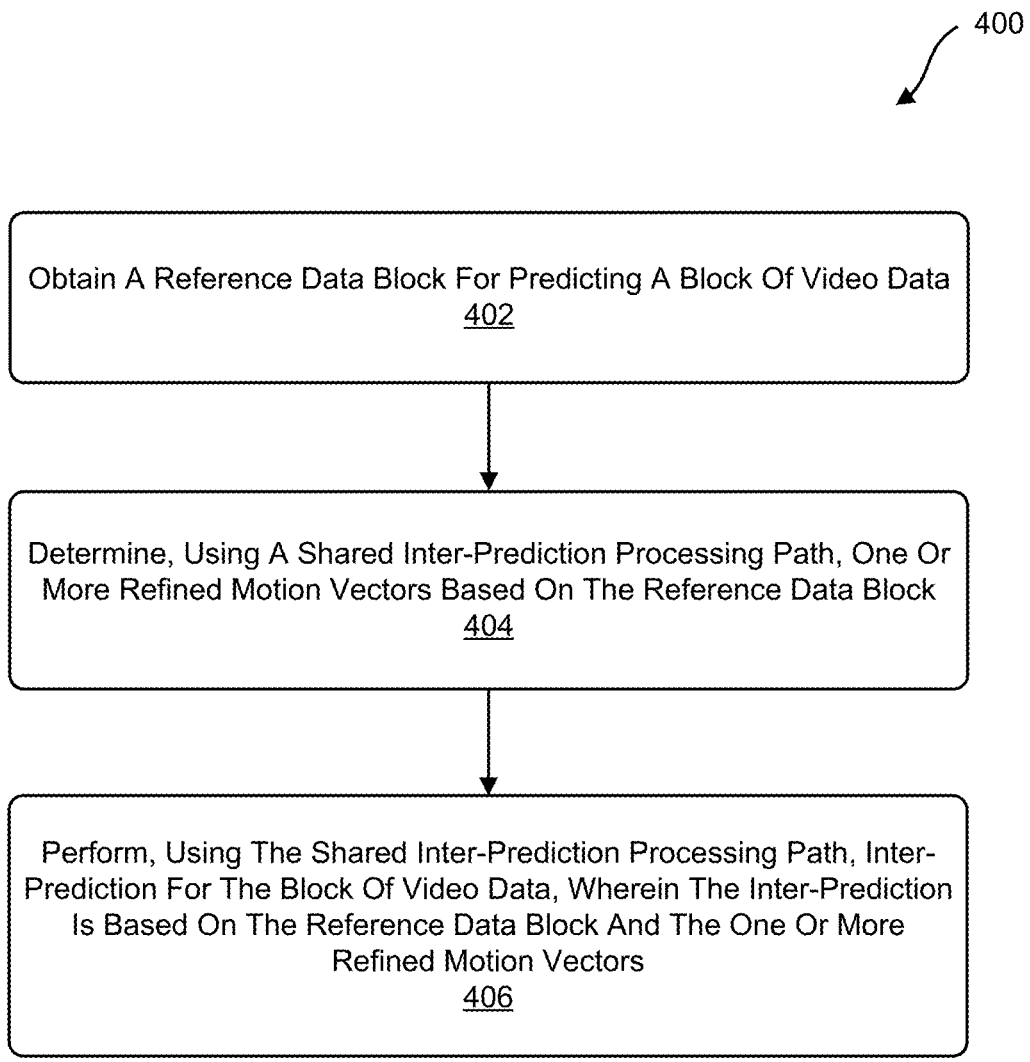
FIG. 4 is a flow diagram illustrating an example of a process for processing audio data, in accordance with some examples.

FIG. 4 is a flow diagram illustrating an example of a process 400 for processing image and/or video data. At block 402, the process 400 includes obtaining a reference data block for predicting a block of video data. For example, the reference data block can be obtained using one or more of the reference pre-fetch block 310 and/or the direct memory access (DMA) controller 312 illustrated in FIG. 3. In some cases, the reference data block can be obtained based on an inter-prediction PU command received at a reference pre-fetch block (e.g., reference pre-fetch block 310 illustrated in FIG. 3). The inter-prediction PU command can be used by the reference pre-fetch block (e.g., reference pre-fetch block 310 illustrated in FIG. 3) to generate and transmit a pre-fetch request to a DMA controller (e.g., DMA controller 312 illustrated in FIG. 3). In some examples, the reference data block can be obtained by or provided to a data-path scheduler block, such as the data-path scheduler block 320 illustrated in FIG. 3.

At block 404, the process 400 includes determining, using a shared inter-prediction processing path, one or more refined motion vectors based on the reference data block. For example, the shared inter-prediction processing path can include one or more of the first shared interpolation filter 382 and the second shared interpolation filter 384 illustrated in FIG. 3. In some examples, the shared inter-prediction processing path can additionally, or alternatively, include the shared weighted prediction (e.g., WPRED) and sum of absolute differences (e.g., SAD) block 386 illustrated in FIG. 3. In some examples, the process 400 includes determining the one or more refined motion vectors by using the inter-prediction processing path as a motion vector refinement path. For example, the inter-prediction processing path can be used as a motion vector refinement path by configuring the first interpolation filter (e.g., the first shared interpolation filter 382 illustrated in FIG. 3) to perform a 2-tap 20×2 horizontal interpolation and configuring the second interpolation filter (e.g., the second shared interpolation filter 384) to perform a 2-tap 20×2 vertical interpolation. In some aspects, the process 400 includes performing inter-prediction for the block of video data by using the inter-prediction processing path as a pixel prediction path. For example, the inter-prediction processing path can be used as a pixel prediction path by configuring the first interpolation filter (e.g., the first shared interpolation filter 382 illustrated in FIG. 3) to perform an 8-tap 8×2 horizontal interpolation and configuring the second interpolation filter (e.g., the second shared interpolation filter 384) to perform an 8-tap 8×2 vertical interpolation.

In some examples, the one or more refined motion vectors can be determined by using a first interpolation filter to perform a 2-tap horizontal interpolation based on the reference data block. The first interpolation filter can be the same as or similar to the first shared interpolation filter 382 illustrated in FIG. 3 and/or can be the same as or similar to the 2-tap horizontal interpolation filter 252 illustrated in FIG. 2. In some examples, the one or more refined motion vectors can be determined by using a second interpolation to perform a 2-tap vertical interpolation based on the reference data block. The second interpolation filter can be the same as or similar to the second shared interpolation filter 384 illustrated in FIG. 3 and/or can be the same as or similar to the 2-tap vertical interpolation filter 254 illustrated in FIG. 2.

In some examples, the shared inter-prediction processing path can be used to determine a sum of absolute differences (SAD) based on the 2-tap horizontal interpolation and the 2-tap vertical interpolation. For example, the shared inter-prediction processing path can include the shared WPRED and SAD block 386 illustrated in FIG. 3. The shared WPRED and SAD block 386 illustrated in FIG. 3 can be used to determine the weighted prediction and to determine the SAD using a same arithmetic logic. In some cases, the process 400 can further include generating the one or more refined motion vectors using the SAD and one or more original motion vectors associated with the block of video data. In some aspects, the process 400 can include generating the one or more refined motion vectors based on the SAD determined for the 2-tap horizontal interpolation and the 2-tap vertical interpolation, wherein the SAD is determined based on a sum of the 2-tap horizontal interpolation and a negation of the 2-tap vertical interpolation. For example, the SAD can be determined by multiplying one of the 2-tap horizontal interpolation or the 2-tap vertical interpolation by −1 and determining a sum of the negation with the remaining one of the 2-tap horizontal interpolation or the 2-tap vertical interpolation.

At block 406, the process 400 includes performing, using the shared inter-prediction processing path, inter-prediction for the block of video data. The inter-prediction can be based on the reference data block and the one or more refined motion vectors. For example, the shared inter-prediction processing path can include one or more of the first shared interpolation filter 382 and the second shared interpolation filter 384 illustrated in FIG. 3. For example, the shared inter-prediction processing path can include a 2-tap 32×2 horizontal interpolation filter as the first interpolation filter (e.g., the first shared interpolation filter 382 illustrated in FIG. 3). In some examples, the shared inter-prediction processing path can include a 2-tap 32×2 vertical interpolation as the second interpolation filter (e.g., the second shared interpolation filter 384 illustrated in FIG. 3). In some examples, the shared inter-prediction processing path can additionally, or alternatively, include the shared weighted prediction (e.g., WPRED) and sum of absolute differences (e.g., SAD) block 386 illustrated in FIG. 3. In some examples, inter-prediction can be performed by using the shared inter-prediction processing path to perform pixel prediction using a refined motion vector. The refined motion vector can be generated by using the shared inter-prediction processing path to perform DMVR and generate the refined motion vector.

In some examples, performing inter-prediction for the block of video data can include determining, using a first interpolation filter, an 8-tap horizontal interpolation based on the reference data block and a first refined motion vector. The first interpolation filter can be the same as or similar to the first shared interpolation filter 382 illustrated in FIG. 3 and/or can be the same as or similar to the 8-tap horizontal interpolation filter 242 illustrated in FIG. 2. In some examples, performing inter-prediction for the block of video data can include determining, using a second interpolation filter, an 8-tap vertical interpolation based on the reference data block and a second refined motion vector. The second interpolation filter can be the same as or similar to the second shared interpolation filter 384 illustrated in FIG. 3 and/or can be the same as or similar to the 8-tap vertical interpolation filter 244 illustrated in FIG. 2. In some examples, a plurality of inter-predicted pixels can be generated using the 8-tap horizontal interpolation and the 8-tap vertical interpolation.

For example, a weighted prediction can be determined using the 8-tap horizontal interpolation and the 8-tap vertical interpolation, wherein the weighted prediction is determined based on a sum of the 8-tap horizontal interpolation and the 8-tap vertical interpolation. In some examples, the weighted prediction can be determined using the shared weighted prediction and SAD block 386 illustrated in FIG. 3. In some aspects, the process 400 can include generating the plurality of inter-predicted pixels based on the weighted prediction.

In some aspects, the process 400 includes generating an encoded video bitstream comprising one or more pictures, at least one picture of the one or more pictures being based on the inter-prediction performed for the block of video data. For example, the encoded video bitstream can be generated by the reconstruction interface 370 illustrated in FIG. 3 and/or can be generated based on the inter-predicted pixels output by the reconstruction interface 370 illustrated in FIG. 3. In some aspects, the process 400 includes transmitting the encoded video bitstream to a decoding device, the encoded video bitstream being transmitted with signaling information. In some aspects, the process 400 includes storing the encoded video bitstream. In some aspects, the process 400 includes obtaining one or more encoded pictures, at least one encoded picture of the one or more encoded pictures including the block of video data. In some examples, the process 400 includes decoding the block of video data from the at least one encoded picture. In some aspects, the process 400 includes decoding the block of video data from the at least one encoded picture by reconstructing the block of video data.

Figure 5:
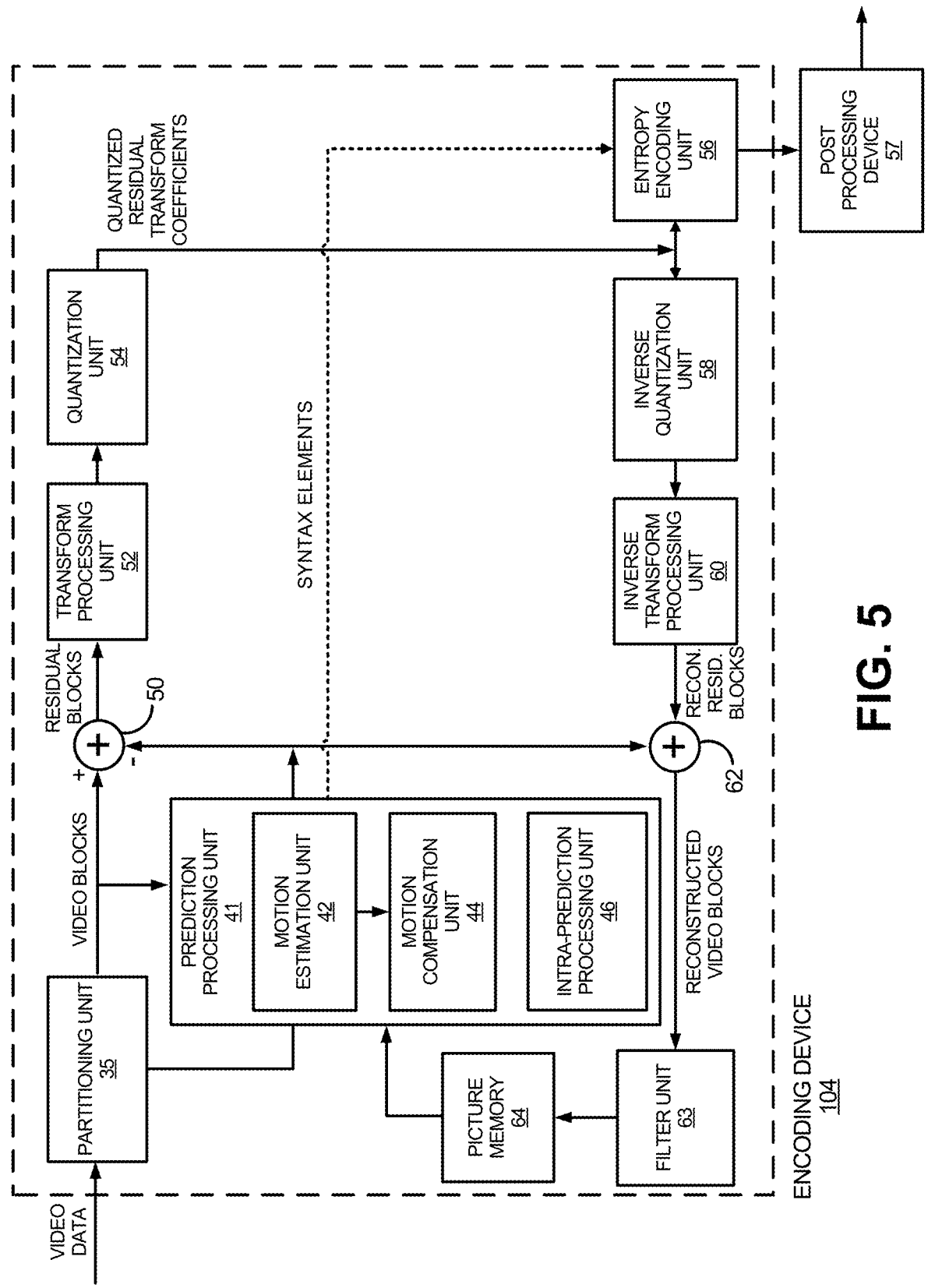
FIG. 5 is a block diagram illustrating an example video encoding device, in accordance with some examples.
Figure 6:
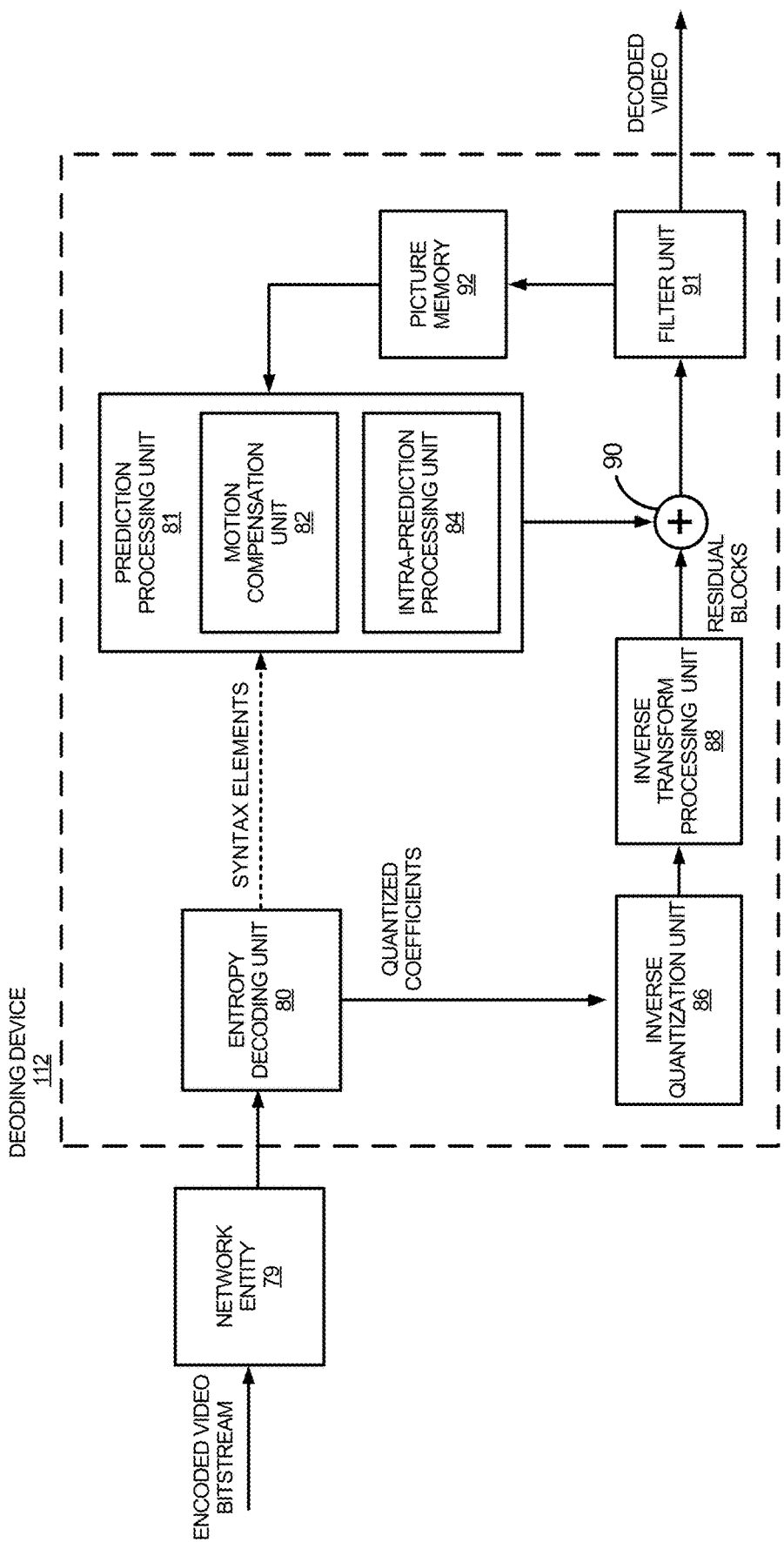
FIG. 6 is a block diagram illustrating an example video decoding device, in accordance with some examples.

In some examples, the process 400 can be performed by a decoding device (e.g., the decoding device 112 of FIG. 1 and FIG. 6). In some cases, the process 400 can be performed by an encoding device (e.g., the encoding device 104 of FIG. 1 and FIG. 5).

In some implementations, the processes (or methods) described herein can be performed by a computing device or an apparatus, such as the system 100 shown in FIG. 1. For example, the processes can be performed by the encoding device 104 shown in FIG. 1 and FIG. 5, by another video source-side device or video transmission device, by the decoding device 112 shown in FIG. 1 and FIG. 6, and/or by another client-side device, such as a player device, a display, or any other client-side device. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The processes can be described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Specific details of the encoding device 104 and the decoding device 112 are shown in FIG. 5 and FIG. 6, respectively. FIG. 5 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 5 as being an in-loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 5, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components.

Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 5 represents an example of a video encoder configured to perform the techniques described herein. For instance, the encoding device 104 may perform any of the techniques described herein, including the processes described herein. In some cases, some of the techniques of this disclosure may also be implemented by post processing device 57.

FIG. 6 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 5.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 6 as being an in-loop filter, in other configurations, filter unit 91 may be implemented as a post-loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In this manner, the decoding device 112 of FIG. 6 represents an example of a video decoder configured to perform the techniques described herein. For instance, the decoding device 112 may perform any of the techniques described herein, including the processes described herein.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. While illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for processing video data, comprising: at least one memory; and at least one processor coupled to the at least one memory and configured to: obtain a reference data block for predicting a block of video data; determine, using an inter-prediction processing path, one or more refined motion vectors based on the reference data block; and perform, using the inter-prediction processing path, inter-prediction for the block of video data, wherein the inter-prediction is based on the reference data block and the one or more refined motion vectors.

Aspect 2. The apparatus of Aspect 1, wherein, to determine the one or more refined motion vectors the at least one processor is configured to: determine, using a first interpolation filter, a 2-tap horizontal interpolation based on the reference data block; and determine, using a second interpolation filter, a 2-tap vertical interpolation based on the reference data block.

Aspect 3. The apparatus of any of Aspects 1 to 2, wherein the at least one processor is configured to: determine a sum of absolute difference (SAD) based on the 2-tap horizontal interpolation and the 2-tap vertical interpolation; and generate the one or more refined motion vectors using the SAD and one or more original motion vectors associated with the block of video data.

Aspect 4. The apparatus of any of Aspects 1 to 3, wherein, to perform inter-prediction for the block of video data the at least one processor is configured to: determine, using the first interpolation filter, an 8-tap horizontal interpolation based on the reference data block and a first refined motion vector; determine, using the second interpolation filter, an 8-tap vertical interpolation based on the reference data block and a second refined motion vector; and generate a plurality of inter-predicted pixels using the 8-tap horizontal interpolation and the 8-tap vertical interpolation.

Aspect 5. The apparatus of any of Aspects 1 to 4, wherein the at least one processor is configured to: determine a weighted prediction using the 8-tap horizontal interpolation and the 8-tap vertical interpolation, wherein the weighted prediction is determined based on a sum of the 8-tap horizontal interpolation and the 8-tap vertical interpolation; and generate the plurality of inter-predicted pixels based on the weighted prediction.

Aspect 6. The apparatus of any of Aspects 1 to 5, wherein the at least one processor is configured to: generate the one or more refined motion vectors based on a sum of absolute difference (SAD) determined for the 2-tap horizontal interpolation and the 2-tap vertical interpolation; wherein the SAD is determined based on a sum of the 2-tap horizontal interpolation and a negation of the 2-tap vertical interpolation.

Aspect 7. The apparatus of any of Aspects 1 to 6, wherein the at least one processor is configured to: determine the weighted prediction and determine the SAD using arithmetic logic.

Aspect 8. The apparatus of any of Aspects 1 to 7, wherein: the inter-prediction processing path includes the first interpolation filter and the second interpolation filter; the first interpolation filter is a 2-tap 32×2 horizontal interpolation filter; and the second interpolation filter is a 2-tap 32×2 vertical interpolation filter.

Aspect 9. The apparatus of any of Aspects 1 to 8, wherein: to determine the one or more refined motion vectors, the at least one processor is configured to use the inter-prediction processing path as a motion vector refinement path; and to perform inter-prediction for the block of video data, the at least one processor is configured to use the inter-prediction processing path as a pixel prediction path.

Aspect 10. The apparatus of any of Aspects 1 to 9, wherein the at least one processor is configured to: use the inter-prediction processing path as a motion vector refinement path by configuring the first interpolation filter to perform a 2-tap 20×2 horizontal interpolation and configuring the second interpolation filter to perform a 2-tap 20×2 vertical interpolation; and use the inter-prediction processing path as a pixel prediction path by configuring the first interpolation filter to perform an 8-tap 8×2 horizontal interpolation and configuring the second interpolation filter to perform an 8-tap 8×2 vertical interpolation.

Aspect 11. The apparatus of any of Aspects 1 to 10, wherein the at least one processor is configured to: generate an encoded video bitstream comprising one or more pictures, at least one picture of the one or more pictures being based on the inter-prediction performed for the block of video data.

Aspect 12. The apparatus of any of Aspects 1 to 11, wherein the at least one processor is configured to: transmit the encoded video bitstream to a decoding device, the encoded video bitstream being transmitted with signaling information.

Aspect 13. The apparatus of any of Aspects 1 to 12, wherein the at least one processor is configured to: store the encoded video bitstream.

Aspect 14. The apparatus of any of Aspects 1 to 13, wherein the at least one processor is configured to: obtain one or more encoded pictures, at least one encoded picture of the one or more encoded pictures including the block of video data; and decode the block of video data from the at least one encoded picture.

Aspect 15. The apparatus of any of Aspects 1 to 14, wherein, to decode the block of video data from the at least one encoded picture, the at least one processor is configured to reconstruct the block of video data.

Aspect 16. A method of processing video data, comprising: obtaining a reference data block for predicting a block of video data; determining, using an inter-prediction processing path, one or more refined motion vectors based on the reference data block; and performing, using the inter-prediction processing path, inter-prediction for the block of video data, wherein the inter-prediction is based on the reference data block and the one or more refined motion vectors.

Aspect 17. The method of Aspect 16, wherein determining the one or more refined motion vectors includes: determining, using a first interpolation filter, a 2-tap horizontal interpolation based on the reference data block; and determining, using a second interpolation filter, a 2-tap vertical interpolation based on the reference data block.

Aspect 18. The method of any of Aspects 16 to 17, further comprising: determining a sum of absolute difference (SAD) based on the 2-tap horizontal interpolation and the 2-tap vertical interpolation; and generating the one or more refined motion vectors using the SAD and one or more original motion vectors associated with the block of video data.

Aspect 19. The method of any of Aspects 16 to 18, wherein performing inter-prediction for the block of video data includes: determining, using the first interpolation filter, an 8-tap horizontal interpolation based on the reference data block and a first refined motion vector; determining, using the second interpolation filter, an 8-tap vertical interpolation based on the reference data block and a second refined motion vector; and generating a plurality of inter-predicted pixels using the 8-tap horizontal interpolation and the 8-tap vertical interpolation.

Aspect 20. The method of any of Aspects 16 to 19, further comprising: determining a weighted prediction using the 8-tap horizontal interpolation and the 8-tap vertical interpolation, wherein the weighted prediction is determined based on a sum of the 8-tap horizontal interpolation and the 8-tap vertical interpolation; and generating the plurality of inter-predicted pixels based on the weighted prediction.

Aspect 21. The method of any of Aspects 16 to 20, further comprising: generating the one or more refined motion vectors based on a sum of absolute difference (SAD) determined for the 2-tap horizontal interpolation and the 2-tap vertical interpolation; wherein the SAD is determined based on a sum of the 2-tap horizontal interpolation and a negation of the 2-tap vertical interpolation.

Aspect 22. The method of any of Aspects 16 to 21, further comprising: determining the weighted prediction and determine the SAD using arithmetic logic.

Aspect 23. The method of any of Aspects 16 to 22, wherein: the inter-prediction processing path includes the first interpolation filter and the second interpolation filter; the first interpolation filter is a 2-tap 32×2 horizontal interpolation filter; and the second interpolation filter is a 2-tap 32×2 vertical interpolation filter.

Aspect 24. The method of any of Aspects 16 to 23, wherein: determining the one or more refined motion vectors includes using the inter-prediction processing path as a motion vector refinement path; and performing inter-prediction for the block of video data includes using the inter-prediction processing path as a pixel prediction path.

Aspect 25. The method of any of Aspects 16 to 24, further comprising: using the inter-prediction processing path as a motion vector refinement path by configuring the first interpolation filter to perform a 2-tap 20×2 horizontal interpolation and configuring the second interpolation filter to perform a 2-tap 20×2 vertical interpolation; and using the inter-prediction processing path as a pixel prediction path by configuring the first interpolation filter to perform an 8-tap 8×2 horizontal interpolation and configuring the second interpolation filter to perform an 8-tap 8×2 vertical interpolation.

Aspect 26. The method of any of Aspects 16 to 25, further comprising: generating an encoded video bitstream comprising one or more pictures, at least one picture of the one or more pictures being based on the inter-prediction performed for the block of video data.

Aspect 27. The method of any of Aspects 16 to 26, further comprising: transmitting the encoded video bitstream to a decoding device, the encoded video bitstream being transmitted with signaling information.

Aspect 28. The method of any of Aspects 16 to 27, further comprising: storing the encoded video bitstream.

Aspect 29. The method of any of Aspects 16 to 28, further comprising: obtaining one or more encoded pictures, at least one encoded picture of the one or more encoded pictures including the block of video data; and decode the block of video data from the at least one encoded picture.

Aspect 30. The method of any of Aspects 16 to 29, wherein decoding the block of video data from the at least one encoded picture includes reconstructing the block of video data.

What is claimed is:

1. An apparatus for processing video data, comprising:
at least one memory; and
at least one processor coupled to the at least one memory and configured to:
obtain a reference data block for predicting a block of video data;
determine, using a first configuration of a plurality of interpolation logic units used to implement a first interpolation filter and a second interpolation filter of a shared inter-prediction processing path, one or more refined motion vectors based on the reference data block, wherein in the first configuration the first interpolation filter is configured to determine a 2-tap horizontal interpolation based on the reference data block and the second interpolation filter is configured to determine a 2-tap vertical interpolation based on the reference data block;
perform, using a second configuration of the plurality of interpolation logic units of the shared inter-prediction processing path, inter-prediction for the block of video data, wherein the inter-prediction is based on the reference data block and the one or more refined motion vectors, and wherein in the second configuration the first interpolation filter is configured to determine an 8-tap horizontal interpolation based on the reference data block and a first refined motion vector and the second interpolation filter is configured to determine an 8-tap vertical interpolation based on the reference data block and a second refined motion vector; and generate a plurality of inter-predicted pixels using the 8-tap horizontal interpolation and the 8-tap vertical interpolation.

2. The apparatus of claim 1, wherein the at least one processor is configured to:

determine a sum of absolute difference (SAD) based on the 2-tap horizontal interpolation and the 2-tap vertical interpolation; and generate the one or more refined motion vectors using the SAD and one or more original motion vectors associated with the block of video data.

3. The apparatus of claim 1, wherein the at least one processor is configured to:

determine a weighted prediction using the 8-tap horizontal interpolation and the 8-tap vertical interpolation, wherein the weighted prediction is determined based on a sum of the 8-tap horizontal interpolation and the 8-tap vertical interpolation; and generate the plurality of inter-predicted pixels based on the weighted prediction.

4. The apparatus of claim 2, wherein the at least one processor is configured to:

generate the one or more refined motion vectors based on a sum of absolute difference (SAD) determined for the 2-tap horizontal interpolation and the 2-tap vertical interpolation;

wherein the SAD is determined based on a sum of the 2-tap horizontal interpolation and a negation of the 2-tap vertical interpolation.

5. The apparatus of claim 4, wherein the at least one processor is configured to:

determine the weighted prediction and determine the SAD using arithmetic logic.

6. The apparatus of claim 1, wherein:

the inter-prediction processing path includes the first interpolation filter and the second interpolation filter;

the first interpolation filter is a 2-tap 32×2 horizontal interpolation filter; and the second interpolation filter is a 2-tap 32×2 vertical interpolation filter.

7. The apparatus of claim 6, wherein:

to determine the one or more refined motion vectors, the at least one processor is configured to use the inter-prediction processing path as a motion vector refinement path; and to perform inter-prediction for the block of video data, the at least one processor is configured to use the inter-prediction processing path as a pixel prediction path.

8. The apparatus of claim 7, wherein the at least one processor is configured to:

use the inter-prediction processing path as a motion vector refinement path by configuring the first interpolation filter to perform a 2-tap 20×2 horizontal interpolation and configuring the second interpolation filter to perform a 2-tap 20×2 vertical interpolation; and use the inter-prediction processing path as a pixel prediction path by configuring the first interpolation filter to perform an 8-tap 8×2 horizontal interpolation and configuring the second interpolation filter to perform an 8-tap 8×2 vertical interpolation.

9. The apparatus of claim 1, wherein the at least one processor is configured to:

generate an encoded video bitstream comprising one or more pictures, at least one picture of the one or more pictures being based on the inter-prediction performed for the block of video data.

10. The apparatus of claim 9, wherein the at least one processor is configured to:

transmit the encoded video bitstream to a decoding device, the encoded video bitstream being transmitted with signaling information.

11. The apparatus of claim 9, wherein the at least one processor is configured to:

store the encoded video bitstream.

12. The apparatus of claim 1, wherein the at least one processor is configured to:

obtain one or more encoded pictures, at least one encoded picture of the one or more encoded pictures including the block of video data; and decode the block of video data from the at least one encoded picture.

13. The apparatus of claim 12, wherein, to decode the block of video data from the at least one encoded picture, the at least one processor is configured to reconstruct the block of video data.

14. A method of processing video data, comprising:

obtaining a reference data block for predicting a block of video data;

determining, using a first configuration of a plurality of interpolation logic units used to implement a first interpolation filter and a second interpolation filter of a shared inter-prediction processing path, one or more refined motion vectors based on the reference data block, wherein in the first configuration the first interpolation filter is configured to determine a 2-tap horizontal interpolation based on the reference data block and the second interpolation filter is configured to determine a 2-tap vertical interpolation based on the reference data block;

performing, using a second configuration of the plurality of interpolation logic units of the shared inter-prediction processing path, inter-prediction for the block of video data, wherein the inter-prediction is based on the reference data block and the one or more refined motion vectors, and wherein in the second configuration the first interpolation filter is configured to determine an 8-tap horizontal interpolation based on the reference data block and a first refined motion vector and the second interpolation filter is configured to determine an 8-tap vertical interpolation based on the reference data block and a second refined motion vector; and generating a plurality of inter-predicted pixels using the 8-tap horizontal interpolation and the 8-tap vertical interpolation.

15. The method of claim 14, further comprising:

determining a sum of absolute difference (SAD) based on the 2-tap horizontal interpolation and the 2-tap vertical interpolation; and generating the one or more refined motion vectors using the SAD and one or more original motion vectors associated with the block of video data.

16. The method of claim 14, further comprising:

determining a weighted prediction using the 8-tap horizontal interpolation and the 8-tap vertical interpolation, wherein the weighted prediction is determined based on a sum of the 8-tap horizontal interpolation and the 8-tap vertical interpolation; and generating the plurality of inter-predicted pixels based on the weighted prediction.

17. The method of claim 16, further comprising:
generating the one or more refined motion vectors based on a sum of absolute difference (SAD) determined for the 2-tap horizontal interpolation and the 2-tap vertical interpolation;
wherein the SAD is determined based on a sum of the 2-tap horizontal interpolation and a negation of the 2-tap vertical interpolation.

18. The method of claim 17, further comprising:
determining the weighted prediction and determine the SAD using arithmetic logic.

19. The method of claim 14, wherein:
the inter-prediction processing path includes the first interpolation filter and the second interpolation filter;
the first interpolation filter is a 2-tap 32×2 horizontal interpolation filter; and
the second interpolation filter is a 2-tap 32×2 vertical interpolation filter.

20. The method of claim 19, wherein:
determining the one or more refined motion vectors includes using the inter-prediction processing path as a motion vector refinement path; and
perform inter-prediction for the block of video data includes using the inter-prediction processing path as a pixel prediction path.

21. The method of claim 20, further comprising:
using the inter-prediction processing path as a motion vector refinement path by configuring the first interpolation filter to perform a 2-tap 20×2 horizontal interpolation and configuring the second interpolation filter to perform a 2-tap 20×2 vertical interpolation; and
using the inter-prediction processing path as a pixel prediction path by configuring the first interpolation filter to perform an 8-tap 8×2 horizontal interpolation and configuring the second interpolation filter to perform an 8-tap 8×2 vertical interpolation.

22. The method of claim 14, further comprising:
generating an encoded video bitstream comprising one or more pictures, at least one picture of the one or more pictures being based on the inter-prediction performed for the block of video data.

23. The method of claim 22, further comprising:
transmitting the encoded video bitstream to a decoding device, the encoded video bitstream being transmitted with signaling information.

24. The method of claim 22, further comprising:
storing the encoded video bitstream.

25. The method of claim 14, further comprising:
obtaining one or more encoded pictures, at least one encoded picture of the one or more encoded pictures including the block of video data; and
decode the block of video data from the at least one encoded picture.

26. The method of claim 25, wherein decoding the block of video data from the at least one encoded picture includes reconstructing the block of video data.

* * * * *